May 22, 1956 L. F. R. FELL 2,746,256
CONTROLS FOR MULTIPLE ENGINE POWER PLANTS
Filed Aug. 31, 1949 5 Sheets-Sheet 1
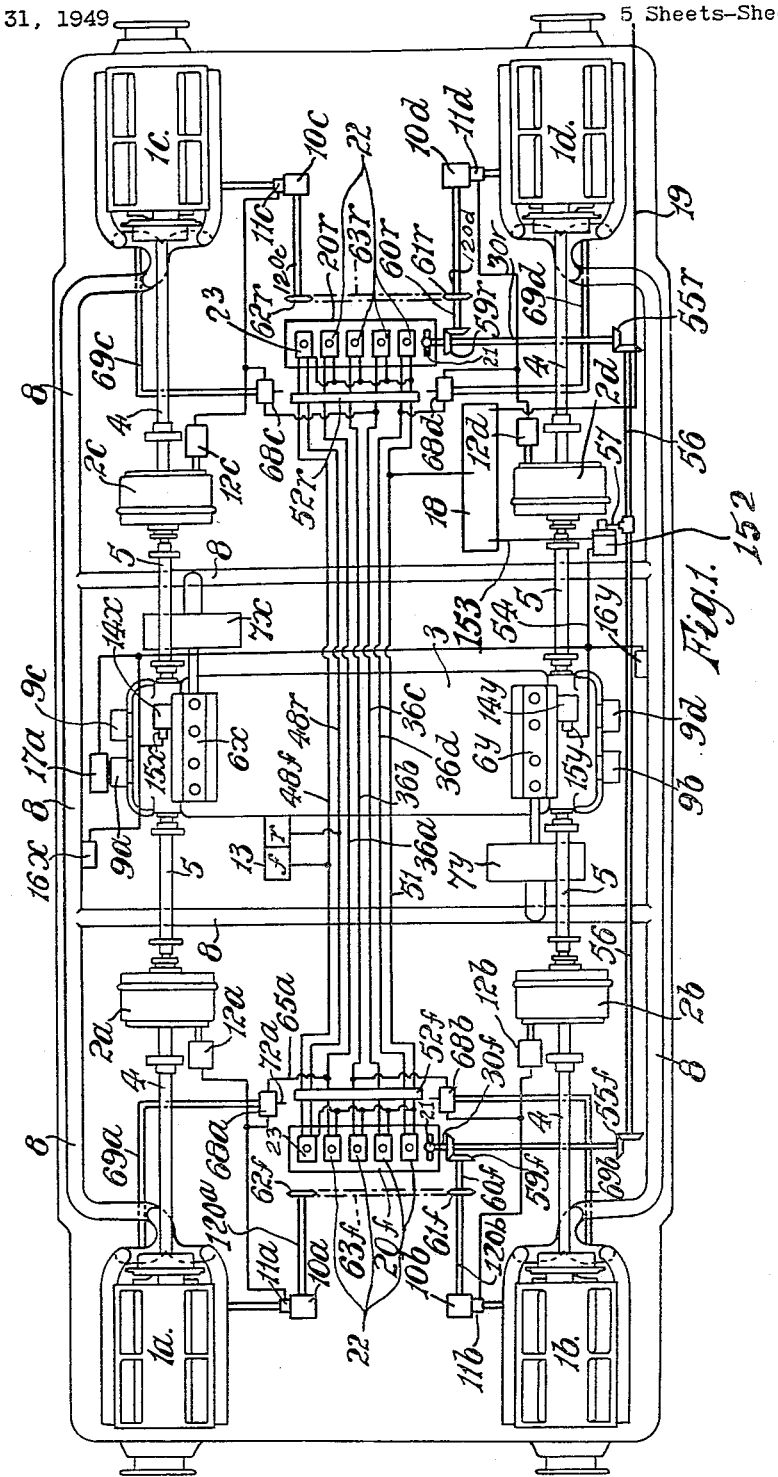
Louis F. R. Fell INVENTOR

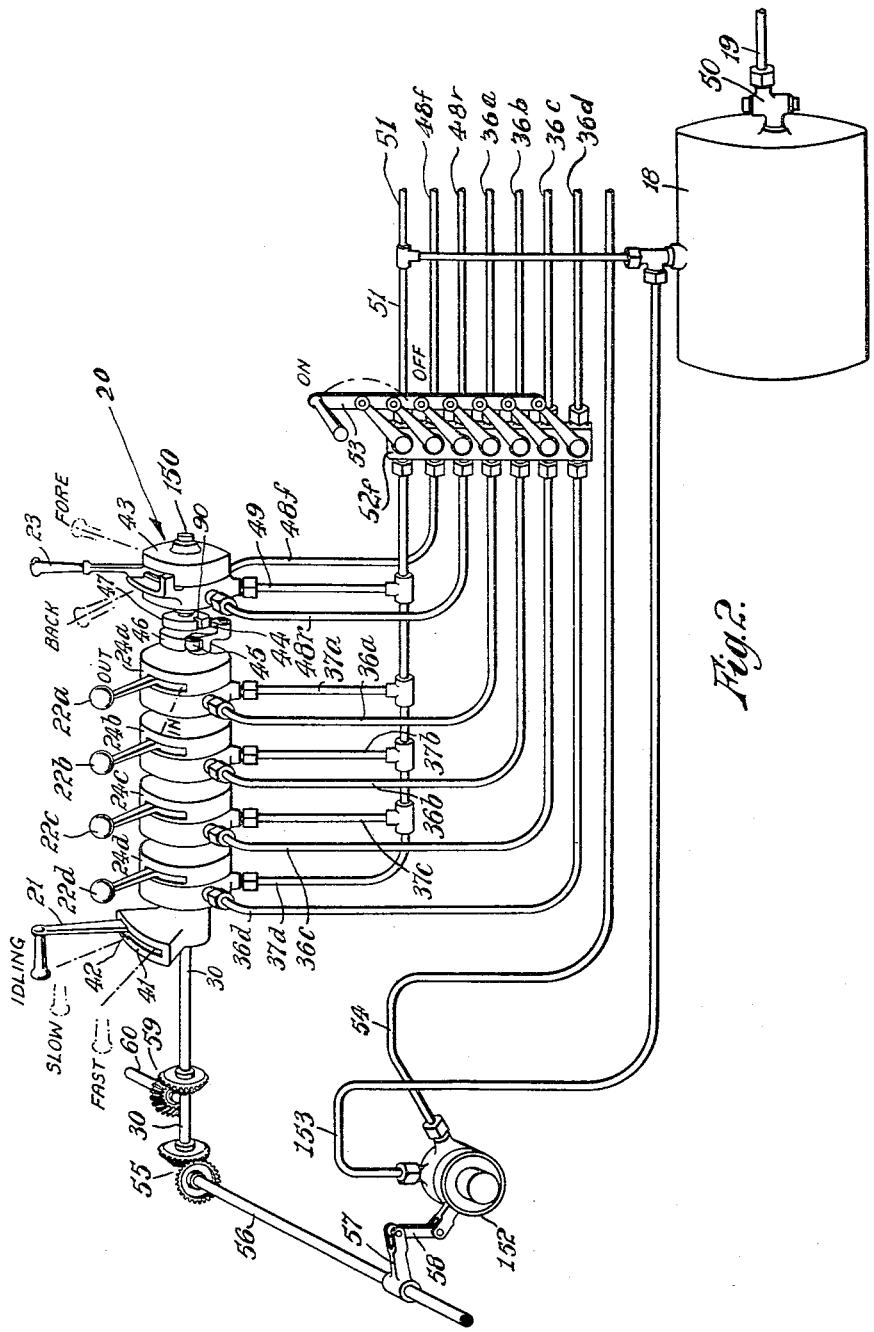

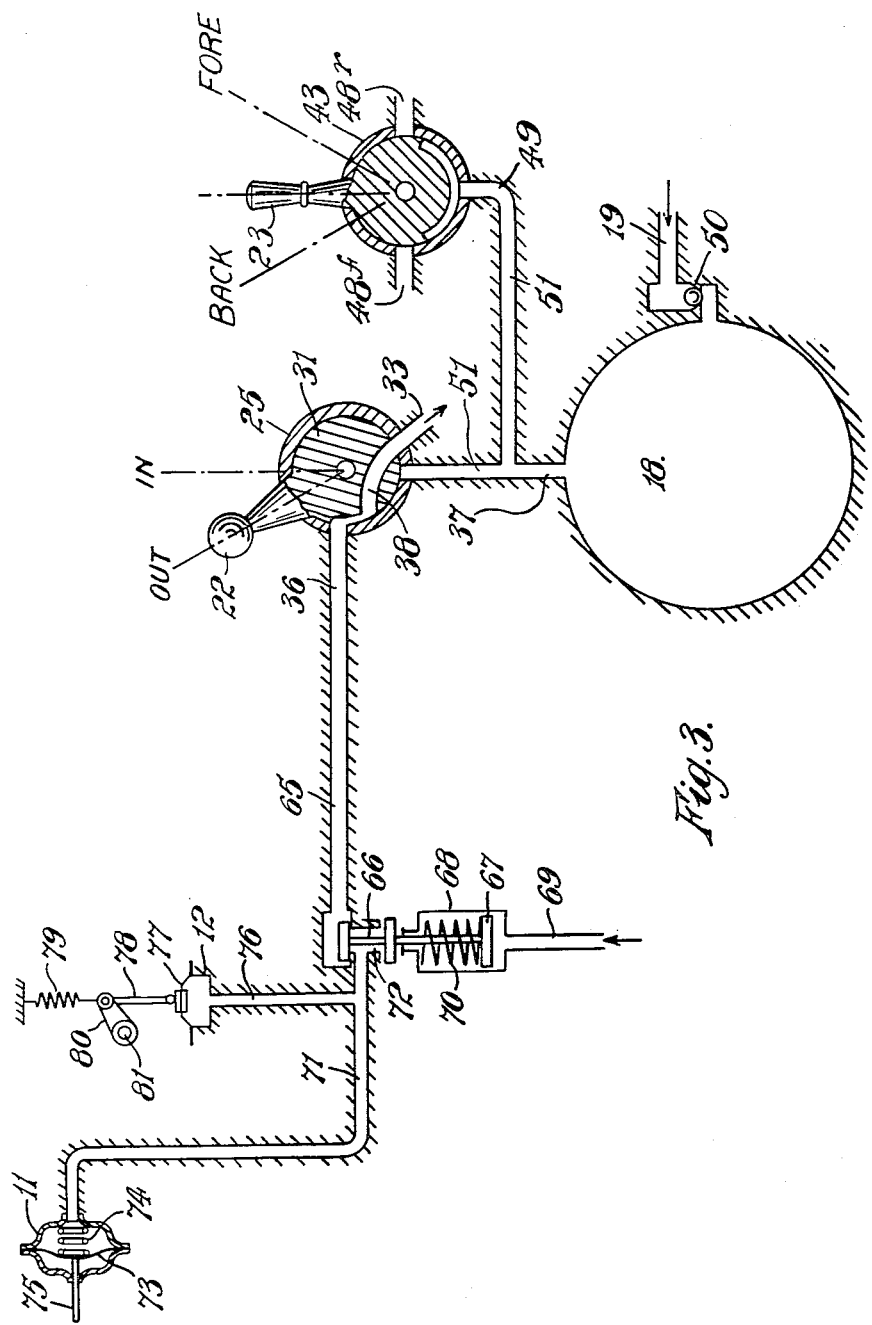

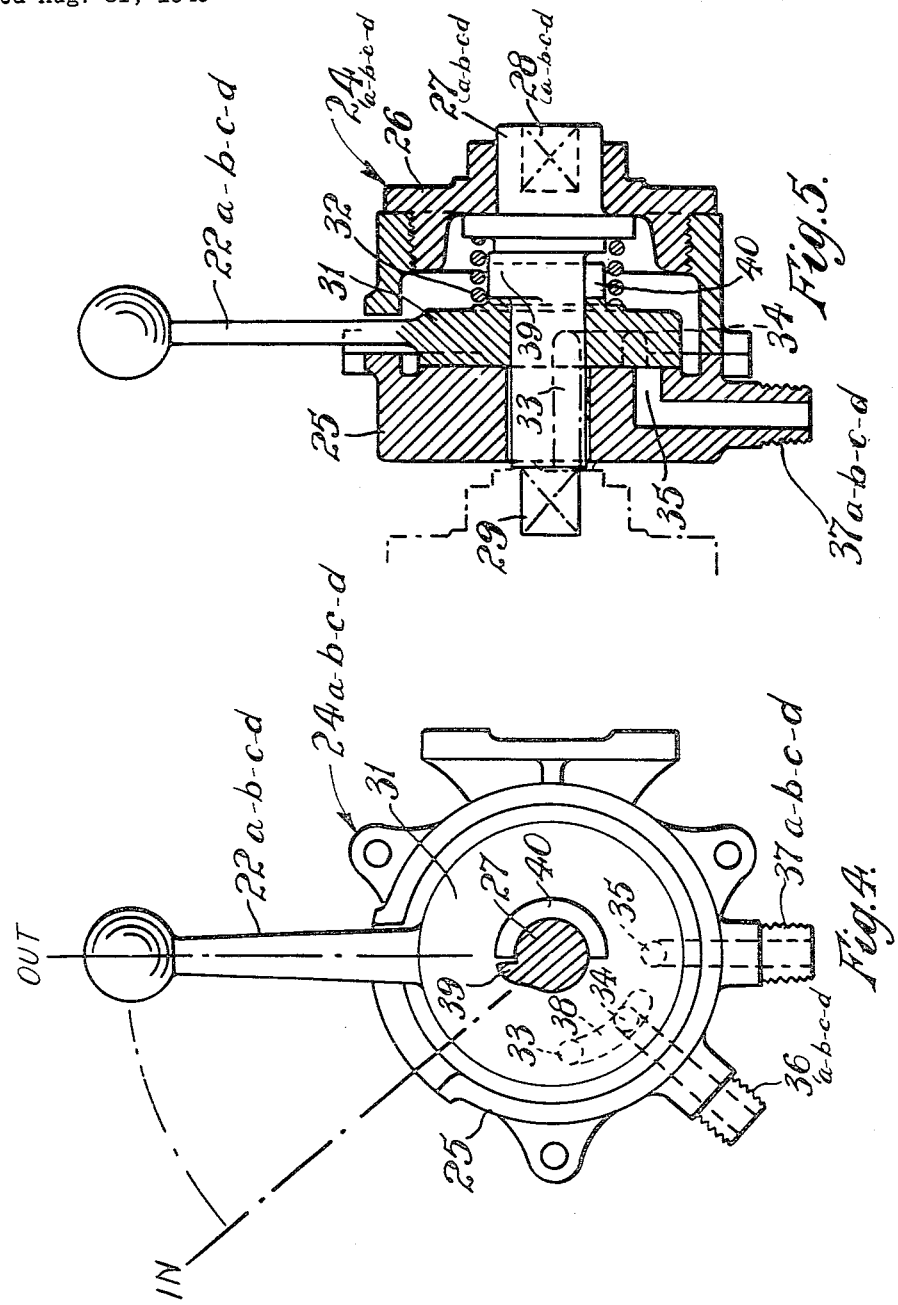

United States Patent Office
2,746,256
Patented May 22, 1956

2,746,256

CONTROLS FOR MULTIPLE ENGINE POWER PLANTS

Louis Frederick Rudston Fell, Littleover, England, assignor to Fell Developments Limited, London, England, a British company Application August 31, 1949, Serial No. 113,369

Claims priority, application Great Britain September 14, 1948

6 Claims. (Cl. 60—97)

This invention relates to power plants and is particularly concerned with the control of the power output of multiple, compression ignition engine power plants of the general type disclosed in my prior Patents 2,589,788, granted March 18, 1952; 2,600,983, granted June 17, 1952; 2,610,526, granted September 16, 1952; 2,619,800, granted December 2, 1952, and 2,637,169, granted May 5, 1953, all of which are companion inventions, the applications for patent of which were copending herewith.

In the operation of power plants as for the drive of locomotives, in order to start the locomotive a fluid coupling associated with one of the main engines is filled and simultaneously the fuel injected into this engine is increased to enable the engine to develop its maximum torque. After the locomotive has developed an appropriate low speed, another fluid coupling associated with a second main engine is filled and the fuel injection of the second engine is increased. This increases the speed of the locomotive and the process is repeated for the other main engines in succession where more than two such main engines are provided. The present invention provides a system for controlling such power plants for such starting with a minimum number of manual controls.

In accordance with the present invention an individual fuel injection throttle is provided for each main engine, together with a single manual control for all of such throttles. Each main engine is also provided with a cut-off under the control of the fluid coupling of each engine to reduce fuel injection to that of idling speed, regardless of the throttle setting, when the filling control of the engine coupling is set for fluid emptying and to restore fuel injection to that determined by the throttle setting when the individual filling control is moved to coupling filling position. Thus, to bring a motor into operation, not only must the appropriate filling control be operated, but the throttle must be adjusted to give sufficient fuel to prevent stalling. It is therefore advantageous to provide an interlock between the throttles and the several filling controls to prevent operation of the latter until the throttle is in a position which will enable running of the motor under load. Since the throttle of each motor engine is restricted to the idling charge until the filling control is opened, racing of the engines is prevented. Motors are preferably supercharged by blowers driven from one or more auxiliary compression ignition internal combustion motors. The fuel injection of each auxiliary motor may be governed by a cut-off which is operated by the main motor throttle when in the idling position to reduce the fuel injection to the auxiliary motor to the idling charge. The throttle in its idling position may also be arranged to release the boost pressure in the supercharging system to a value near atmospheric, as described in Patent No. 2,600,983 and then to render inoperative one or more of the unidirectional devices described in Patent No. 2,610,526. The movements of the throttle and the filling controls may be transmitted to some or all of the several control members of the plant by means of a vacuum, hydraulic or pneumtic transmission.

The invention is illustrated by way of example by the accompanying drawings in which:

Figure 1 is a diagrammatic plan view with the cowling removed of a railway locomotive having a power plant of the kind forming the subject of the aforesaid Patent 2,589,788 and incorporationg a control system according to the present invention;

Figure 2 is a diagrammatic perspective view of a set of manual controls associated with the control system;

Figure 3 is a fragmentary diagrammatic view of part of the control system associated with one of the main motors of the power plant;

Figure 4 is a sectional end view of one of the control valves;

Figure 5 is a sectional elevation of the valve shown in Figure 4, and

Figure 6:
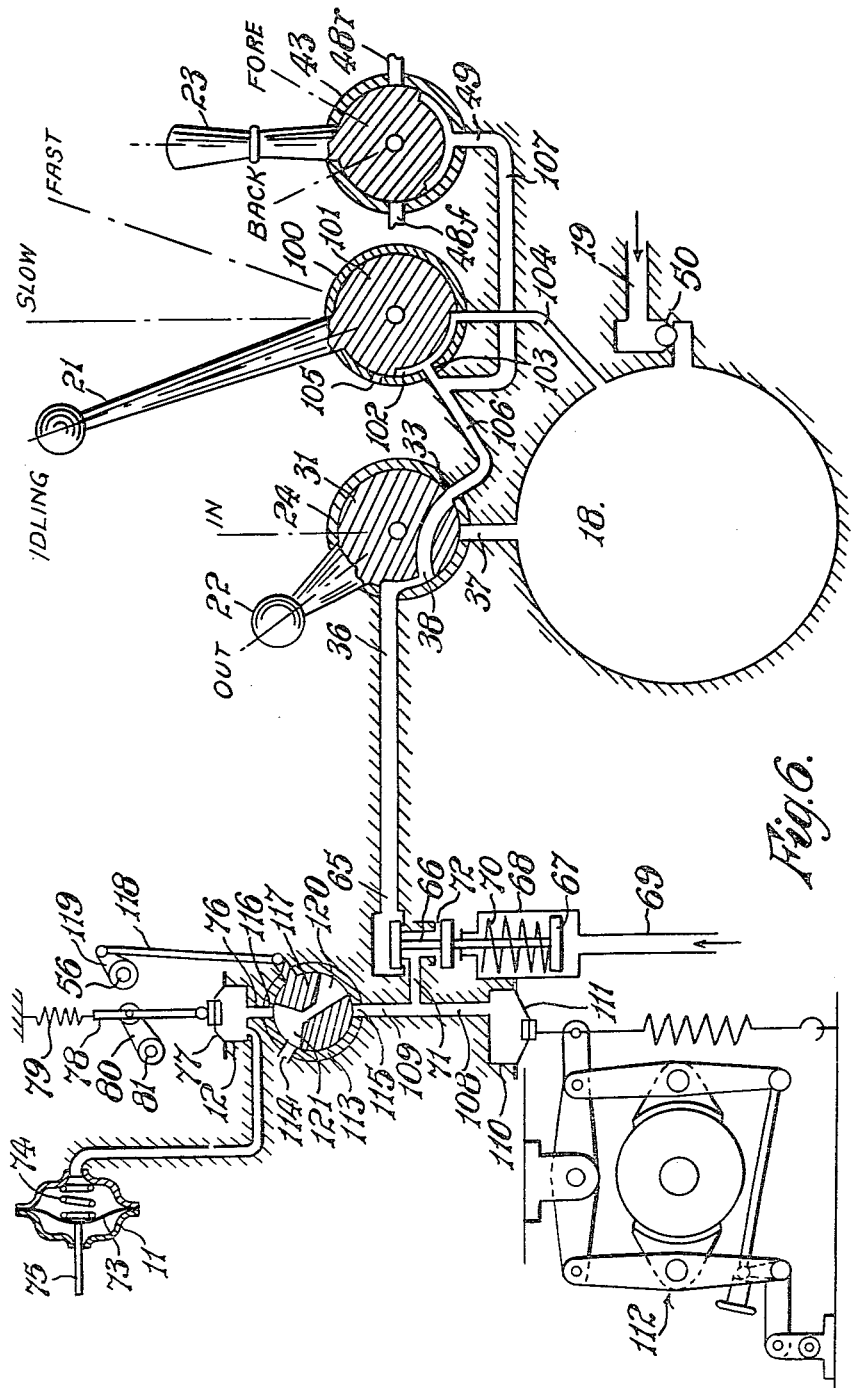
Figure 6 is a fragmentary view similar to that of Figure 3 of part of a modified control system.

In that form of the invention here presented in Figure 1, a power plant adapted for railway locomotive drive comprising four main compression ignition internal combustion engines $1a$, $1b$, $1c$ and $1d$ is illustrated. These engines drive their respective variable-filling fluid couplings $2a$, $2b$, $2c$ and $2d$ through their shafts 4, said couplings in turn deliver, when filled, rotation to a gear box 3 through shafts 5. From the gear box 3 drive to the wheels of the locomotive is provided through unidirectional devices, $9a$, $9b$, $9c$ or $9d$.

Mounted on the gear box 3 are two auxiliary compression ignition internal combustion engines $6x$ and $6y$. These engines drive blowers $7x$ and $7y$ respectively, the outputs of which are passed to a common duct system 8 connected with the inlet manifolds of the several main engines.

Each of the engines $1a$, $1b$, $1c$ and $1d$ is directly controlled by a fuel injection throttling valve $10a$, $10b$, $10c$ and $10d$ respectively and each such throttling valve is provided with a cut-off $11a$, $11b$, $11c$ and $11d$. Filling and emptying of the couplings $2a$, $2b$, $2c$ and $2d$ is by means of valves $12a$, $12b$, $12c$ and $12d$ respectively. The present invention relates to the control arrangement for these instrumentalities as well as the related control of a reverse valve 13 having forward and reverse compartments $f$ and $r$. The control arrangement also includes constant speed governors $14x$ and $14y$ for the auixiliary engines $6x$ and $6y$ and these governor cut-offs $15x$ and $15y$ and boost control valves $16x$ and $16y$ permitting blow-off of excess supercharging air. A release $17a$ for one of the unidirectional devices, here shown as $9a$, is also included in the control.

The various control members are actuated by the manual control levers shown in Figure 2, through the medium of a vacuum. It will be understood that in place of a vacuum, the control could be exercised through a pneumatic or hydraulic medium.

Vacuum is supplied to the several control members, described above, through a system of pipes from a vacuum reservoir 18 connected in known manner with the train pipe 19 through a non-return valve 50.

The actuation of the throttles $10a$, $10b$, $10c$, and $10d$ as well as the distribution of the vacuum to the other control members is governed by the manual control levers shown in Figure 2. A set of such control levers is provided at each end of the locomotive and these sets are shown generally as $20f$ and $20r$ in Figure 1. One such set, namely $20f$, is shown in Figure 2. Each set consists of a regulator 21 for mechanically rotating a shaft 30 and therefore through beveled gears 55 and 59 ($f$ or $r$ as the case may be) the intertie shaft 56 and the throttle shaft 60. The device of Figure 2 also includes fluid coupling filling control levers 22a, 22b, 22c and 22d, each associated with one of the main engines and a reversing lever 23.

Each filling control lever operates a valve 24a, 24b, 24c or 24d. One lever and valve are shown in Figures 4 and 5. It will be understood that the suffix letters a, b, c, d, x, y, f and r are added to the reference numerals in the drawings and related description in order to denote association of the part in question with one of the main or auxiliary engines, or the front or rear end or forward or reverse direction of the locomotive. Where, as in the case of Figures 4 and 5, for example, a part is shown which is representative of a number of similar parts, it is denoted only by its reference numeral without the addition of a suffix letter. Likewise a group of such parts may be referred to in the text by the reference numeral without the suffix letters appropriate to the several members of the group.

Referring now to Figures 4 and 5, the valve 24 consists of a hollow body 25 through which passes a shaft 27 journalled in an end wall 26 of the body. The shaft 27 has a square hole 28 at one end and a square boss 29 at the other end, which latter fits in the square hole of the shaft passing through the next adjacent valve body. The boss 29 of the valve 22d next to the regulator 21 fits in a square hole in a shaft 30 to which the regulator 21 is keyed. Journalled on the shaft 27 is a valve plate 31 which is integral with the filling control lever 22. The plate 31 is pressed by a spring 32 against an internal face of the body 25 so as to make a gas-tight fit therewith. The body 25 has three ports 33, 34 and 35. Port 33 is open to atmosphere, port 34 communicates with a pipe 36 and port 35 with a pipe 37. The valve plate 31 has an arcuate slot 38. When the lever 22 is in the Out position as shown in the full lines of Figures 4 and 5, the slot 38 connects port 34 with atmosphere via port 33, and when the lever is in the In position shown in broken lines in Figure 4, the slot 38 connects port 34 with port 35. The shaft 27 has a lug 39 which engages a boss 40 on the valve plate 31. The lever 22 works in a gate in the valve body 25 which determines the extreme positions marked Out and In of the lever. The regulator 21 (Figure 2) works in a housing 41, a gate 42 being provided in this housing at the position of the regulator marked Idling. The angular position of the shaft 27 is determined by that of the regulator 21, and the position shown in Figure 4 corresponds with the Idling position of the regulator. Thus it will be observed that the lever 22 cannot be moved unless the regulator 21 is first moved from the Idling position. Movement of the regulator to the position marked Slow is, however, sufficient to enable lever 22 to be moved to the position marked In.

The reversing lever 23 operates a valve 43. This valve is similar to the valves 24 except in respect of its mechanical interlock with the regulator 21. This interlock is afforded by a detent 44 which is mounted on a fixed pivot and is operated by a roller 45. The roller 45 is urged by a spring (not shown) against a cam 46 keyed to the end of the shaft 27a projecting from the valve 24a. The cam 46 has a hollow in which the roller 45 rests when the regulator 21 is in the Idling position. Fixed to the shaft 150 on which the lever 23 is keyed is a plate 47 having two slots, of which one can be seen at 90. When the roller is in the hollow of the cam 46, the detent 44 is clear of the plate 47 and the lever 23 can be moved freely. When the lever 23 has been moved to one of its extreme positions marked Fore and Back, the regulator 21 can be moved from the Idling position, thus lifting the roller 45 and causing the detent 44 to engage in one of the slots 90 and lock the lever 23. The latter cannot be moved again until the regulator is brought back to the Idling position, nor can the regulator be moved out of this position unless the detent 44 is engaged in one of the slots 90. The lever 23 carries a valve plate having a slot similar to the slot 38 in the plate 31, and the valve body has three ports which communicate respectively with pipes 48f, 49 and 48r.

Each of the pipes 37a, 37b, 37c and 37d, and the pipe 49 are connected with a pipe 51 which is itself connected with the vacuum reservoir 18. Each of the pipes 36a, 36b, 36c, 36d, 48f, 48r and 51 runs through the locomotive to the set of valves similar to the valves 24 and 43 comprised in the control set 20r as shown schematically in Figure 1. A cut-out valve is, however, provided in each pipe at each end of the locomotive adjacent to the respective sets of valves. The two sets of cut-out valves, shown as 52f and 52r in Figure 1, are each controlled by a single arm 53 as shown in Figure 2.

Branching from the pipes 36a, 36b, 36c and 36d are pipes connected respectively with the vacuum-actuated cut-off members 11a, 11b, 11c and 11d of the main engine governors, and with the filling control members 12a, 12b, 12c and 12d of the fluid couplings; and branching from pipes 48f and 48r are pipes connected respectively with the sides f and r of the reversible gear control member 13.

In addition to the valves described above, a further valve 152 is provided which is actuated by the regulator 21. The valve 152 is similar to the valves 24 except that the valve body has only two ports, communicating with pipes 153 and 54 respectively. The valve plate has a slot which in one position of the plate connects the two ports with each other and in the other position cuts off this connection. The pipe 153 is connected directly with the vacuum reservoir 18 and the pipe 54 branches to the remainder of the vacuum-actuated controls enumerated above, namely, the vacuum-actuated cut-off members 15x and 15y of the governors of the auxiliary engines, the boost control valves 16x and 16y, and the release member 17a of the unidirectional device 9a. The valve 152 is actuated by the regulator 21 through shaft 30, bevel gears 55, an interlock shaft 56 by way of lever 57 fixed to the shaft 56, and link 58. As before noted, interlock shaft 56 passes through the locomotive to the set of controls at the opposite end where it is likewise connected with the regulator at that end through a like set of bevel gears 55.

It will be understood from the foregoing that the locomotive may be driven from either set of controls 20f or 20r. In order to drive from control set 20f, for example, valves 52r are closed and valves 52f are opened. The regulator handle is preferably made removable, in which case the handle is removed from control set 20r and inserted in set 20f when driving from this set of controls. The principal function of the regulator is to actuate the setting control members 120a, 120b, 120c and 120d of the governors 10a, 10b, 10c and 10d which govern the supply of fuel to the main engines. In the case of governor 10b, when driving from control set 20f, the member 120b is actuated through bevel gears 59f and shaft 60f, the member 120b being a continuation of the shaft 60f. Shaft 60f carries a chain sprocket 61f, which drives a chain sprocket 62f through a chain 63f, thus actuating setting control member 120a of governor 10a. The setting control members of governors 10c and 10d are actuated in like manner through shaft 56, bevel gears 55r, shaft 30r, bevel gears 59r, shaft 60r, chain sprockets 61r and 62r, and chain 63r.

Referring now to Figure 3, which is a diagrammatic representation of the valving and piping for the controls associated with one main engine, it will be seen that the pipe 36 communicates with a pipe 65, which is in fact a branch from pipe 36 although it is shown in Figure 3 as continuous with that pipe. The pipe 65 is interrupted by valve 66 which is carried by a plunger 67 operating in a cylinder 68. This cylinder communicates by way of pipe 69 with the oil circuit of the main engine in question, so that when the oil pressure is up to the correct value the plunger 67 is pushed inwards against the action of a compression spring 70. Thus when the oil pressure is adequate, pipe 65 is connected with pipe 71, while if the oil pressure drops to an unsafe value, pipe 71 is opened to atmosphere by way of port 72.

Pipe 71 leads to the vacuum-actuated cut-off member 11 of one of the main engine governors. The member 11 comprises a chamber in which is a diaphragm 73 which is urged to the left (as seen in Figure 3) by a spring 74. The diaphragm 73 carries a rod 75, which, when it is in its right-hand position, allows the governor to deliver the full quantity of fuel determined by the speed of the engine and the position of the regulator 21 and, when it is in its left-hand position, over-rides the regulator and limits the quantity of fuel to that necessary for idling. Mechanism for obtaining this result is described, for example, in Patent No. 2,600,983.

Branching from the pipe 71 is a pipe 76 leading to the filling control member 12. This control member comprises a diaphragm chamber having a diaphragm 77 to which is attached a rod 78. The latter rod is urged upwards as seen in Figure 3) by a tension spring 79, and has pivoted to it an arm 80 fixed to a shaft 81 which controls the position of the scoop in the fluid coupling. When the rod 78 is in the position shown, the scoop is in the position for emptying the coupling, but if the rod 78 moves downwards, resulting in clockwise movement of the shaft 81, filling of the coupling ensues.

In the operation of the control system the original setting of the valve 152 is such that with the regulator 21 at the Idling position, pipe 54 is cut off from pipe 153. During the travel of the regulator from the Slow to the Fast position, these pipes are connected together by the slot in the valve plate. At the Idling position, the control members actuated by the regulator are at the following settings:

1. The vacuum-actuated cut-off members 15 restrict the fuel supplied to the auxiliary engines to the idling charge.

2. The boost control valves 16 release the pressure in the boost pipes 8 to a value near atmospheric.

3. The release member 17a releases the unidirectional device 9a, this permitting the locomotive to move freely under an applied force.

When the regulator 21 is moved to the Slow, Fast or an intermediate position, hereinafter referred to as a running position, valve 152 connects pipe 153 with pipe 54 and vacuum is applied to the above control members, which react as follows:

1. The cut-off members 15 allow the governors 14 to control the fuel injection of the auxiliary engines so as to maintain them at a constant speed, which latter is determined by the speed setting of the governors. This speed setting is itself controlled by the pressure in the ducts 8 in such a manner that the supercharging pressure required for the main engine is produced.

2. The boost control valves 16 are closed to retain the full supercharging pressure (see Patent No. 2,600,983).

3. The release member 17a brings into action the unidirectional device 9a (see Patent No. 2,610,526).

When the regulator has been moved to a running position, any of the filling control levers 22 can be moved from the Out to the In position. Considering the action of one of these levers, and assuming that the main engine in question is idling and is producing the requisite oil pressure, the effect of moving this lever to the In position is as follows:

1. Vacuum is applied to the chamber of the governor cut-off member 11 and moves the diaphragm 73 and rod 75 to the right (Figure 3). This allows the fuel injected into the main engine to be increased to the quantity determined by the speed of the engine and the position of the regulator 21 (see Patent No. 2,600,983).

2. Vacuum is applied to the chamber of the member 12 and causes the shaft 81 to move in a clockwise direction (Figure 3), thus causing the fluid coupling 2 to fill.

Thus in order to start the locomotive from rest, each of the main engines 1 and the auxiliary engines 6 must first be started and idling. The lever 23 is set, according to the direction in which the locomotive is to move, in the Fore or Back position. The regulator 21 is then moved to the Slow or a running position, causing the main engines to be fully supercharged, and one of the levers 22 is moved to the In position. The fluid coupling 2 then fills and the fuel injected into the corresponding main engine increases to the quantity required to build up the torque of the engine and set the locomotive in motion (see Patent No. 2,600,983).

In order to increase the speed of the locomotive, the remaining filling control levers are successively moved to the In position, thus successively adding the outputs of the remaining main engines. If any main engine stops accidentally, or is stopped by means of an overriding hand control (not shown) on the governor 10 (see Patent No. 2,600,983), the oil pressure fails, and the valve 66 releases the vacuum in the pipe 71 and thus causes the fuel injection to drop and the fluid coupling to empty. If it is desired to coast, the regulator 21 is pulled back to the Idling position, whereby the filling control levers 22 are moved to the Out position owing to the mechanical interlock shown in Figures 4 and 5. The fluid couplings 2 then empty, thus freeing the transmsision from engine drag.

While the auxiliary engines 6 have been shown as delivering air into a boost system common to all the main engines 1 this system can, if desired, be divided into two separate systems, one fed by the engine 6x and feeding engines 1a and 1b, the other fed by engine 6y and feeding engines 1c and 1d. This division is necessary if the supercharging pressure required for the two pairs of engines is different, for example where the gear ratios for these pairs of engines is different as described in Patent No. 2,619,800.

Figure 6 is a diagrammatic view, corresponding with Figure 3, of a control system for use where the unidirectional devices associated with the several main engines take the form of self-wrapping brakes, as described, for example, in Patent No. 2,637,169. In these brakes the brake shoes are normally held in light frictional contact with the brake drum. When the drum tends to rotate in reverse direction (that is, the direction in which the engine would be driven backwards) the friction between the brake shoes and drum acts to cause the shoes to grip the drum and prevent reverse rotation. It is desirable, however, in order to avoid undue heating and wear, to disengage the shoes entirely from the drum of any brake of which the associated main engine is contributing torque to the output of the power plant. It is also desirable to disengage the shoes of all the brakes when the locomotive is coasting. On the other hand the brake must be operative whenever the associated main engine is not supplying torque while another engine or engines is or are supplying torque to the output of the plant. These conditions of operation are obtained by the system shown in Figure 6.

In addition to the parts shown in Figure 3, which parts are shown in Figure 6 with like reference numerals, the arrangement shown in Figure 6 comprises a valve 100 having a valve plate 101 carried by the regulator 21. The valve plate 101 has a recess 102 which connects a port 103 with the vacuum reservoir 18 via a pipe 104 when the regulator is at the Idling position, and with atmosphere via a port 105 when the regulator is in a running position. Furthermore, the port 33 of the valve 24, instead of communicating with atmosphere, communicates with one end of a pipe 106 the other end of which communicates with port 103 of valve 100. A branch 107 from pipe 106 communicates with pipe 49 leading to the valve 43.

The pipe 71 in Figure 6 branches into pipes 108 and 109. Pipe 108 leads to a diaphragm chamber 110 having a diaphragm 111. The latter diaphragm controls the unidirectional brake 112 in the manner described in Patent No. 2,637,169 so that when vacuum is applied to the chamber 110 the brake is disengaged and when the vacuum is released, the brake is operative. When the locomotive is coasting, the regulator 21 is at the Idling position and lever 22 is at the Out position, so that pipe 36 is connected with pipe 106 and the latter pipe is connected with vacuum through pipe 104. Furthermore, when coasting the main engines are idling and the oil pressure is holding the valve 66 in the position in which pipes 65 and 71 are connected. Vacuum is therefore applied to the chamber 110 and the unidirectional brake 112 is disengaged. Since, however, it is not desired to fill the fluid coupling or operate the member 11 until the regulator has been moved to a running position and the lever 22 has been moved to the In position, a valve 113 is interposed between the pipe 109 and the members 11 and 12. The valve 113 has a port 114 open to atmosphere, a port 115 communicating with pipe 109 and a port 116 communicating with pipe 76. The valve member 117 is mounted so as to be rotatable in the valve by means of a rod 118 which is pivoted to the valve member 117 at one end and at the other to an arm 119 fixed on the shaft 56 which is actuated by the regulator 21 (Figure 1).

The valve member 117 is provided with recesses 120 and 121 as shown. When the regulator 21 is in the Idling position, the valve body closes the pipe 109, and the recess 121 opens to atmosphere the member 12 and the member 11 connected therewith. Thus the vacuum present in the pipe 71 for the purpose of releasing the unidirectional brake 112 does not cause the fluid coupling to fill or allow the fuel injection to increase.

If the regulator 21 is moved to a running position, with the lever 22 still in the Out position, the pipe 106 is connected with atmosphere and the pipe 104 is closed, so that the vacuum in pipes 36, 65 and 71 is released and the brake 112 is operative, preventing back rotation of the main engine in question. When, however, the lever 22 is moved to the In position, pipe 36 is connected with the vacuum reservoir 18, and this vacuum extends through pipes 65, 71 and 109 to port 115 of the valve 113. The vacuum in pipe 71 releases brake 112. Furthermore, owing to the movement of the regulator to a running position, shaft 56, and with it the valve member 117, have moved clockwise (as seen in Figure 6), thus closing the port 114 and connecting ports 115 and 116. The vacuum is thus extended to the members 11 and 12, causing the fluid coupling to fill and the fuel injection to reach its governed and regulated value.

In the modification shown in Figure 6, the valve 43 is not provided with a mechanical interlock with the regulator, but instead derives its vacuum from the pipe 106 which is controlled by the regulator. As described above, this pipe is only connected with vacuum when the regulator is at the Idling position. At all other positions the pipe 106 is connected with atmosphere, so that the reversing gear cannot then be operated.

It will be understood that the other control members actuated by the regulator, namely the members 15 and 16, are not shown in Figure 6.

I claim:

1. In a power plant comprising at least two compression ignition main engines each having fuel injection means variable between idling and full power positions, common driven means, fluid coupling means connecting each main engine to said common driven means, a conduit system for filling and emptying each fluid coupling means and each such system including a valve movable between filling and emptying positions, means connected with each valve for individually controlling the same, a manually operable regulator connected to all of said fuel injecting means for causing simultaneous operation thereof between the idling and full power positions, cut-off mechanism connected to each fuel injection means and to an associated valve for the fluid coupling means for overriding the regulator and positioning the fuel injection means to its idling position in response to movement of said associated valve to its emptying position, regardless of the setting of said regulator.

2. A power plant according to claim 1 wherein interlocking means is provided between said regulator and the means for controlling the fluid coupling valves to prevent movement of such valves to the filling position until the regulator is moved to a position corresponding to fuel injection sufficient to enable running the main engines under load.

3. A power plant according to claim 1 including at least one auxiliary compression-ignition engine having fuel injection means variable between an idling position and a predetermined full load position, supercharging means driven by said auxiliary engine and connected to the main engines for supercharging the latter, governor means connected to the fuel injection means of the auxiliary engine to position the same from its idling to its full load position, cut-off means connected to the auxiliary engine fuel injection means and to said regulator to override said governor means and position the auxiliary engine fuel injection means in its idling position in response to movement of said regulator to a position corresponding to idling fuel injection of the main engines.

4. A power plant according to claim 3 wherein the connection between said supercharging means and the main engines includes a valve for selectively reducing the supercharging pressure to a value near atmospheric, and connecting means between the last mentioned valve and said regulator for operating such valve when the regulator is in the position corresponding to idling fuel injection for the main engines.

5. A power plant according to claim 1 wherein said common driven means includes a unidirectional drive means, release means adapted when operated to render said unidirectional drive means inoperative, and connecting means between said release means and said regulator for operating the release means when the regulator is in the position corresponding to idling fuel injection of the main engines.

6. A power plant according to claim 1 wherein said common driven means is reversible, means for reversing said common driven means, and interlocking means between said regulator and the last mentioned means to prevent reversal of the driven means except when the regulator is in the position corresponding to idling fuel injection of the main engines.

References Cited in the file of this patent

UNITED STATES PATENTS

| | | |
|---|---|---|
| 1,671,480 | Metten | May 29, 1928 |
| 1,868,130 | Bauer et al. | July 19, 1932 |
| 1,953,486 | Kiep | Apr. 3, 1934 |
| 2,283,431 | Gasser | May 19, 1942 |
| 2,428,457 | Hines | Oct. 7, 1947 |
| 2,444,364 | Panish | June 29, 1948 |
| 2,457,568 | Larson | Dec. 28, 1948 |
| 2,534,168 | Greenwood | Dec. 12, 1950 |
| 2,589,788 | Fell | Mar. 18, 1952 |